July 12, 1960      H. A. BAKKE      2,944,460
WINDOW ASSEMBLY FOR EXPOSURE METERS
Filed Dec. 7, 1956
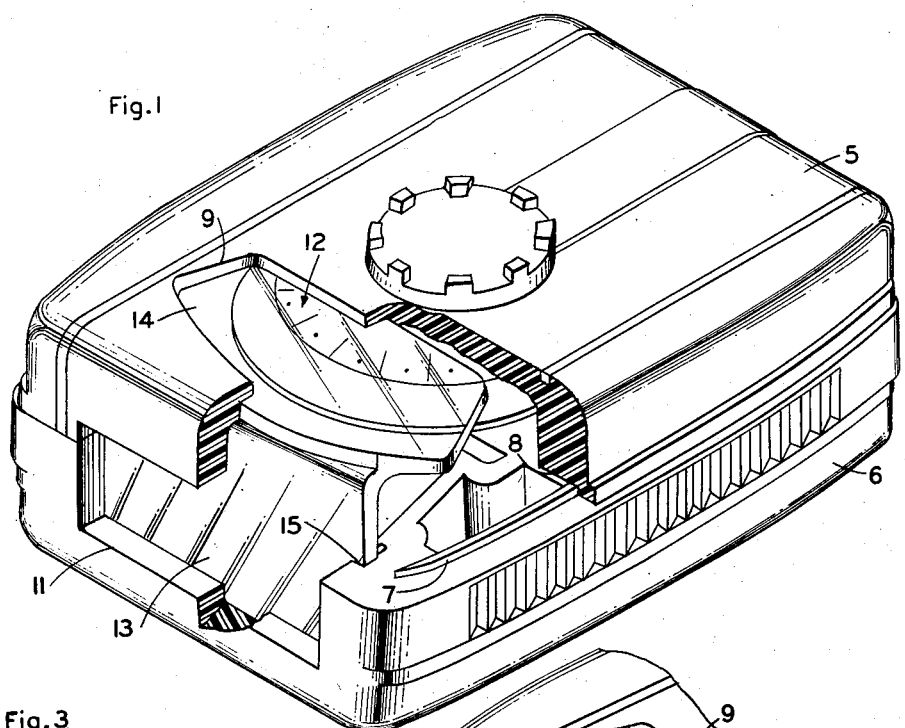
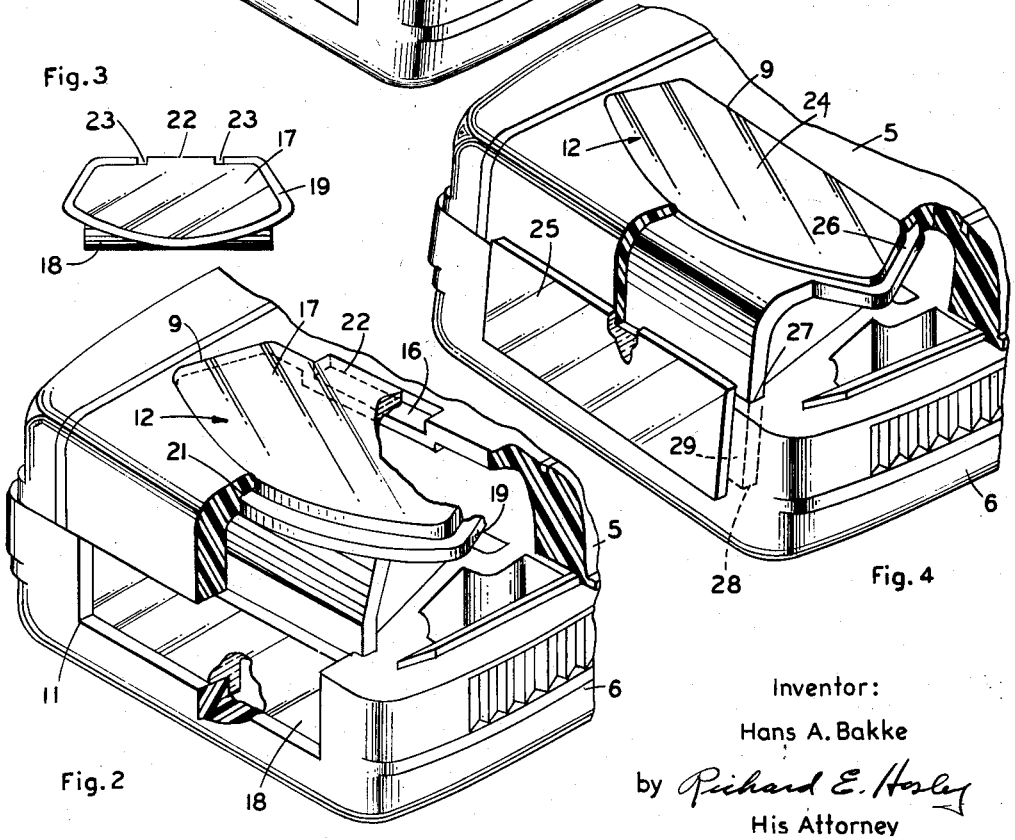
Inventor:
Hans A. Bakke
by Richard E. Hosley
His Attorney

United States Patent Office 2,944,460
Patented July 12, 1960

2,944,460
WINDOW ASSEMBLY FOR EXPOSURE METERS

Hans A. Bakke, Swampscott, Mass., assignor to General Electric Company, a corporation of New York Filed Dec. 7, 1956, Ser. No. 626,853

3 Claims. (Cl. 88—23)

This invention relates to a new and improved window assembly for an exposure meter housing and has for its objects the provision of a window assembly that combines simplicity, effectiveness, and ruggedness with inexpensive manufacturing costs.

Many exposure meters in common use today are in the form of handy, pocket-size devices which normally have two windows in the housing—one for the light responsive cell and one for the indicating dial of the meter. The cell window is often found in the end of the meter housing and the dial window is often found in the top of the housing, near the end containing the cell window.

Such devices usually have two-part housings, for convenience in manufacturing and field service, and heretofore it has been common practice to provide separate windows for each opening in the housing, one or both of which may have to be cemented or otherwise fastened to the housing. Ordinarily, a pair of separable shells is used to form the two-part housing, and each shell has one of the two openings formed therein, thus requiring separate fastening means for each window, with its attendant inconvenience and consequent undesirably high manufacturing costs.

The present invention avoids the inconvenience and high manufacturing costs of the two-piece window assemblies heretofore used by utilizing a novel one-piece window assembly having portions for each opening in the housing and arranged so that it need be fastened to only one part of the housing. The one-piece window assembly may be conveniently formed by molding a suitable transparent plastic material to the desired shape, after which the molded part may be affixed to one of the housing shells to cover one opening in the housing, and automatically covers the other opening upon formation of the complete housing.

The invention, together with its objects and advantages, will be best understood upon reference to the detailed description set forth below, when taken in conjunction with the drawings annexed hereto, in which:

Figure 1 is a perspective view of a typical exposure meter embodying one form of the novel one-piece window assembly, with portions of the exposure meter housing cut away to show how the window assembly cooperates with the housing;

Figure 2 is a partial perspective view, similar to Figure 1, showing another form of the invention;

Figure 3 is a top view, on a reduced scale, of the window assembly shown in Figure 2; and Figure 4 is a partial perspective view, similar to Figure 2, of still another form of the invention.

Referring first to Figure 1, there is shown a handy, pocket-size exposure meter of the type shown in U.S. Design Patent No. 169,766, issued to R. B. Kerr et al., and assigned to the assignee of the subject invention; which, like most of such devices, embodies the usual light responsive cell, self-contained D'Arsonval instrument mechanism, instrument pointer and associated dial or scale.

Such exposure meters are well known in the art and their construction and manner of operation are readily understood, further comment being unnecessary herein, since the aforesaid parts of the exposure meter form no part of the subject invention. The present invention is applicable to the exposure meter shown in the Kerr et al. patent and it is also applicable to other types of exposure meters such as the one shown in U.S. Patents 2,509,893, issued to Taylor et al., and 2,648,254, issued to Stimson et al., both of which are assigned to the assignee of the subject invention. Another type of exposure meter to which the instant invention applies is that shown in U.S. Patent 2,590,165, issued to Fairbank et al., and assigned to the Polaroid Corporation. Detailed descriptions of the working parts of such exposure meters are set forth in the patents enumerated and as said above, further comment is unnecessary herein, since a detailed account of the working parts of the exposure meter would serve only to add unnecessarily to the length of this specification.

In all of the aforesaid types of exposure meters, the working parts are mounted within a two-part housing which has an opening in one of its ends and an opening in one of its faces, both of which are covered by individual windows which are individually fastened in place. The housings are separable to permit ease of manufacture and ease of field service and in all of the patented exposure meters the end window is mounted in the bottom shell and the surface window is mounted in the top shell.

In the exposure meter shown in Figure 1 it is seen that the housing, like those in the patented devices, is a two-part member comprising an upper shell 5 and a lower shell 6 which fit together to form the housing, there being suitable bolts or the like which interconnect and join together the two parts to hold them securely together. The bottom shell may be provided with a mounting ridge 7 which cooperates with a suitable cutout 8 provided in the top shell, the purpose of this construction being to allow the parts to be readily assembled in their proper relative positions, after which the shells are joined together securely by whatever means is employed for such purposes.

The housing has an opening 9 provided in the surface of the shell 5 proximate to the end of the housing which has portions of the ends of both the top and bottom shells cut away to form the opening 11.

Cooperating with the openings 9 and 11 is a one-piece window assembly 12 formed by molding a suitable transparent plastic material and comprising the window portions 13, 14 disposed at right angles to one another. This one-piece window assembly covers both of the openings 9 and 11 and is affixed to the housing by having its window portion 13 mounted within a groove 15 which extends around that part of opening 11 formed in bottom shell 6. Both of the window portions are substantially elongated and are larger than the corresponding openings so that the openings are effectively covered. In addition, the window assembly is configured in such a way that it fits nicely within the housing, taking up no extra space and being secured therein in such a way that the top shell 5 may be removed at will during either manufacture or field service without in any way disturbing the window assembly.

It is thus seen that the one-piece window assembly is supported entirely by the bottom shell and remains in place with the top shell either in place or removed. Suitable spring clips such as those shown in the Taylor Patent No. 2,509,893, could be used if desired to hold the window assembly more securely in the bottom shell.

In Figure 2 there is shown another form of the one-piece window assembly as applied to an exposure meter of the type shown in Figure 1. In the form shown in Figure 2, the window assembly is supported entirely by the top shell as will be more fully described hereinafter.

Using like numbers to identify like parts, it is seen that top shell 5 is of the same overall configuration as the top shell shown in Figure 1, but unlike the shell of Figure 1, its end is not cut away and it has a cut away section 16 extending along the opening 9 in a direction parallel to the end of the housing and at a point proximate to the edge of the window assembly furthest removed from the housing end. As in the arrangement shown in Figure 1, the window assembly 12 is a one-piece molded transparent plastic member having the window portions 17, 18 disposed at right angles to one another. The window portion 17 has a flange 19 extending almost completely around its inner surface to cooperate with a shoulder 21 formed in the shell 5. The inner edge of the window 17 has a projection 22 formed therealong which fits into the cutout 16, the arrangement being such that with the shell 5 removed from the shell 6, the window assembly can be snapped in place by first inserting the projection 22 into the cutout 16 and then pushing the window assembly until the parts fit together snugly with the surface of the window portion 17 being substantially flush with the surface of the shell 5.

As in the arrangement shown in Figure 1, the bottom shell 6 may be grooved along the opposite edges of opening 11 to receive therein the edges of window portion 18. This portion of the window assembly may be raised slightly as shown to provide a flange around its edge which cooperates with the portions of shell 6 surrounding opening 11. With the window assembly 12 snapped in place on shell 5, it is a simple matter to assemble the two shells merely by inserting the edges of window portion 18 into the grooves provided in shell 6 and then pushing the two shells together until they are properly fitted, after which the shells can be joined securely together by whatever means is employed for this purpose.

As is shown in Figure 3, a space 23 separates the projection 22 at both of its ends from the corresponding ends of flange 19. This provides the necessary clearance which allows the window assembly to be readily and quickly snapped into place.

Still another form of the invention is shown in Figure 4 which again shows the top and bottom shells 5 and 6 respectively, having openings 9, 11 therein respectively. The window assembly comprises a one-piece molded transparent plastic member 12 with the surface window portion 24 and the end window portion 25 disposed at right angles to one another.

As in the arrangement of Figure 2, the surface window portion 24 has a flange 26 surrounding its lower edge which cooperates with the shell 5 to provide a snug fit for the window. In this form of the invention the window assembly is held in the bottom shell by a tongue-and-groove connection. As in the arrangements of Figures 1 and 2, the bottom shell 6 is formed with a groove 27 surrounding the opening in its end to receive therein the inner edges 28 of the window portion 25. This window portion is substantially thicker than the arrangements shown in Figures 1 and 2 and is formed with a groove 29 surrounding its periphery which engages the peripheral edge of the opening formed in shell 6 and also engages the peripheral edge of the end of shell 5. By this arrangement a tongue-and-groove joint is achieved and with proper dimensioning of the parts, the window assembly may be held securely in the bottom shell 6.

As in connection with the form shown in Figure 1, upon removal of top shell 5, the window assembly is not disturbed, it being retained by the lower shell.

In all forms of the invention the arrangement is such that the assembly of the two shells together further serves to hold the window assembly securely in place within the housing. It is apparent from the above that a great deal of flexibility is available in the precise design for the window in that it may be mounted in either of the shells in a number of different ways and configured in such a way that the window portions are either recessed, flush with the shells, or project outwardly from the surface of the shells.

In all forms of the invention the window assembly is easily formed by conventional molding techniques and is readily assembled in place on the housing at minimum manufacturing costs.

Therefore, while particular embodiments of the subject invention have been shown and described herein, these are in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. In an exposure meter of the type having apertures in its housing associated with a light responsive cell and an indicating dial, respectively, in combination: a two-part housing comprising top and bottom separable shells, said top shell having a first aperture in its surface proximate to one end thereof, said bottom shell having a portion of one of its ends cut away to form a second aperture, said apertures being proximate to one another, and a one-piece window assembly for covering both of said apertures, said window assembly comprising a molded transparent plastic member having first and second portions substantially at right angles to one another covering corresponding apertures in said housing, one of said portions being interfitted with one of said shells whereby said window assembly is affixed to its interfitted shell and retained therein upon separation of said housing, said portion covering said first aperture fitting snugly therein to have its surface substantially flush with the surface of said top shell, said portion having a flange extending around its periphery which cooperates with the inner surface of said shell surrounding said first aperture, said first aperture and said covering portion of said window assembly being substantially elongated in a direction substantially parallel to the ends of said housing, said flange portion cooperating with the edge of said first aperture removed from said end having a section thereof cooperating with the outer surface of said top shell, said outer surface having a corresponding section cut away to receive said flange section.

2. In an exposure meter of the type having apertures in its housing associated with a light responsive cell and an indicating dial, respectively, in combination: a two-part housing comprising top and bottom separable shells, said top shell having a first aperture in its surface proximate to one end thereof, said bottom shell having a portion of one of its ends cut away to form a second aperture, said apertures being proximate to one another, and a one-piece detachable window assembly for covering both of said apertures, said window assembly comprising a transparent plastic member having two portions substantially at right angles to one another covering corresponding apertures in said housing, one portion of the transparent member including a flange which extends from the inner surface thereof and a projection which extends from the outer surface thereof, and a cutout in the outer edge of the corresponding shell positioned to mate with said projection such that the window assembly may be secured to the said corresponding shell by inserting said projection over said cutout and pressing said flange into contact with the bottom of the periphery of said corresponding housing shell, said window assembly being retained by said corresponding shell upon separation of said housing.

3. In an exposure meter of the type having apertures in its housing associated with a light responsive cell and an indicating dial, respectively, in combination: a two-part housing comprising top and bottom separable shells, said top shell having a first aperture in its surface proximate to one end thereof, said bottom shell having a portion of one of its ends cut away to form a second aperture, said apertures being proximate to one another, and a one-piece detachable window assembly for covering both of said apertures, said window assembly comprising a transparent plastic member having two portions substantially at right angles to one another covering corresponding apertures in said housing, one portion of the transparent member including a flange which extends from the inner surface thereof and a projection which extends from the outer surface thereof, and a cutout in the outer edge of the corresponding shell positioned to mate with said projection such that the window assembly may be secured to the said corresponding shell by inserting said projection over said cutout and pressing said flange into contact with the bottom of the periphery of said corresponding housing shell, said window assembly being retained by said corresponding shell upon separation of said housing, and said other portion of the transparent member including peripheral portions which cooperate with mating portions of the other housing shell to position the said other window portion with respect thereto upon assembly of said meter.

References Cited in the file of this patent

UNITED STATES PATENTS

| | | |
|---|---|---|
| 2,150,836 | Lamb | Mar. 14, 1939 |
| 2,363,796 | Lamb | Nov. 28, 1944 |
| 2,482,281 | Lingle | Sept. 20, 1949 |
| 2,509,366 | Perlin | May 30, 1950 |
| 2,509,893 | Taylor et al. | May 30, 1950 |
| 2,590,165 | Fairbank et al. | Mar. 25, 1952 |

FOREIGN PATENTS

| | | |
|---|---|---|
| 445,960 | Great Britain | Apr. 22, 1936 |